(12) United States Patent
Oguro et al.

(10) Patent No.: US 8,841,407 B2
(45) Date of Patent: Sep. 23, 2014

(54) POLYAMIDE RESINS AND PROCESSES FOR MOLDING THEM

(75) Inventors: Hatsuki Oguro, Kanagawa (JP); Jun Mitadera, Kanagawa (JP); Hisayuki Kuwahara, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/824,695

(22) PCT Filed: Nov. 8, 2011

(86) PCT No.: PCT/JP2011/075658
§ 371 (c)(1),
(2), (4) Date: Mar. 18, 2013

(87) PCT Pub. No.: WO2012/070377
PCT Pub. Date: May 31, 2012

(65) Prior Publication Data
US 2013/0184431 A1    Jul. 18, 2013

(30) Foreign Application Priority Data

Nov. 26, 2010   (JP) .................................. 2010-264058

(51) Int. Cl.
C08G 69/28   (2006.01)
C08G 69/26   (2006.01)
C08L 77/06   (2006.01)

(52) U.S. Cl.
CPC .............. *G08G 69/265* (2013.01); *C08G 69/26* (2013.01); *C08L 77/06* (2013.01)
USPC ............ 528/340; 528/310; 528/339; 528/347

(58) Field of Classification Search
USPC ......................................... 528/339, 340, 347
See application file for complete search history.

(56) References Cited

U.S. PATENT DOCUMENTS

2003/0114591 A1   6/2003  Sato et al.
2009/0299028 A1 * 12/2009  Kikuchi et al. ............... 528/340

FOREIGN PATENT DOCUMENTS

| | | |
|---|---|---|
| CN | 101284906 A | 10/2008 |
| CN | 101591433 A | 12/2009 |
| EP | 0 680 987 A2 | 11/1995 |
| EP | 1 308 478 | 5/2003 |
| EP | 2 130 853 | 12/2009 |
| EP | 2 327 737 | 6/2011 |
| EP | 2 327 738 | 6/2011 |
| EP | 2 505 597 | 10/2012 |
| JP | 44-20637 | 9/1969 |
| JP | 7-324130 | 12/1995 |
| JP | 07-324130 | * 12/1995 |
| JP | 8-259691 | 10/1996 |
| JP | 2003-201399 | 7/2003 |
| JP | 2004-2821 | 1/2004 |
| JP | 2006-257314 | 9/2006 |
| JP | 2008-182172 | 8/2008 |
| JP | 2009-99533 | 5/2009 |
| JP | 2009-202567 | 9/2009 |
| JP | 2010-59366 | 3/2010 |
| TW | 201016748 A1 | 5/2010 |
| TW | 201020274 A1 | 6/2010 |
| WO | WO 2010/032692 A1 | 3/2010 |
| WO | WO 2011/065347 A1 | 6/2011 |

OTHER PUBLICATIONS

International Preliminary Report on Patentability issued Jun. 20, 2013 in Application No. PCT/JP2011/075658 (English Translation).
International Preliminary Report on Patentability issued Jun. 6, 2013 in Application No. PCT/JP2011/075658 (English Translation).
Written Opinion of the International Search Authority issued Feb. 14, 2012 in PCT/JP2011/075658 (Document Previously Filed, Submitting English Translation Only).
International Search Report and Written Opinion issued Feb. 14, 2012 in Application No. PCT/JP2011/075658 (With English Translation).
Office Action issued Dec. 4, 2012 in Japanese Application No. 2012-531923 (With English Translation).
Office Action issued Sep. 25, 2013 in Taiwanese Patent Application No. 100141457 (with English language translation).
Combined Chinese Office Action and Search Report issued Nov. 5, 2013 in Patent Application No. 201180051970.9 (with English language translation).
European Search Report issued Apr. 16, 2014, in European Patent Application No. 11843718.5.

* cited by examiner

*Primary Examiner* — Gregory Listvoyb
(74) *Attorney, Agent, or Firm* — Oblon, Spivak, McClelland, Maier & Neustadt, L.L.P.

(57) ABSTRACT

Provided is a polyamide resin having high heat resistance, excellent moldability and excellent mechanical properties. The polyamide resin comprises a diamine unit containing 70 mol % or more of a xylylenediamine unit and a dicarboxylic acid unit containing 70 mol % or more of a straight chain aliphatic dicarboxylic acid unit, wherein the xylylenediamine unit is composed of 50 to 95 mol % of p-xylylenediamine and 50 to 5 mol % of m-xylylenediamine; the straight chain aliphatic dicarboxylic acid unit is composed of 50 to 100 mol % of adipic acid and 0 to less than 50 mol % of sebacic acid or other straight chain aliphatic dicarboxylic acids; the molar ratio of reacted diamine units to reacted dicarboxylic acid units (the number of moles of reacted diamine units/the number of moles of reacted dicarboxylic acid units) is less than 0.994; and the polyamide resin has a number average molecular weight of 10,000 to 25,000 and a melting point of 285° C. or more.

15 Claims, No Drawings

POLYAMIDE RESINS AND PROCESSES FOR MOLDING THEM

TECHNICAL FIELD

The present invention relates to polyamide resins and processes for molding them, specifically polyamide resins having high heat resistance and excellent mechanical properties and processes for molding them.

BACKGROUND ART

Polyamide resins are widely used as engineering plastics having excellent mechanical strength such as impact resistance and friction/abrasion resistance as well as excellent heat resistance and oil resistance in the fields of automotive parts, electronic/electric equipment parts, office automation equipment parts, machine parts, construction materials/housing parts and the like, and recently have found increasingly wide applications.

Many classes of polyamide resins including e.g., polyamide 6 and polyamide 66 are known, among which m-xylylene adipamide (hereinafter sometimes referred to as "MXD6") derived from m-xylylenediamine and adipic acid is positioned as a very excellent polyamide resin because it contains an aromatic ring in the main chain unlike polyamide 6 and polyamide 66 so that it has high rigidity, low water absorption and excellent oil resistance as well as a low shrinkage ratio during molding and causes little shrinkage or warp, which means that it is also suitable for precision molding. Thus, MXD6 has recently been more widely used as a molding material, especially extrusion molding material in various fields including electronic/electric equipment parts, parts of vehicles such as automobiles, general machine parts, precision machine parts, leisure/sports goods, civil engineering and construction materials, etc.

On the other hand, there have recently been increasingly growing commercial needs in applications requiring high heat resistance, such as reflectors in LED illumination and LED mounting boards, which require high heat resistance during manufacturing or use thereof.

Patent documents 1 to 4 propose to use various polyamide resin compositions for these applications. Patent document 1 discloses a composition comprising a semiaromatic polyamide composed of terephthalic acid and 1,9-nonanediamine and 2-methyl-1,8-octanediamine in combination with titanium oxide, magnesium hydroxide and a filler. This polyamide shows a high melting point around 306° C., for example, but undesirably has problems such as difficulty in molding and low productivity because of poor melt flowability, susceptibility of the resin to decomposition and high gas emission and the like.

In such applications requiring high heat resistance, polyamide resins having a melting point of 280° C. or more, especially higher than 300° C. are desired, but polyamide resins having not only such a high melting point but also excellent moldability have not actually reached an industrially satisfactory level at present.

REFERENCES

Patent Documents

Patent document 1: JPA 2006-257314;
Patent document 2: JPA 2008-182172;
Patent document 3: JPA 2009-99533;
Patent document 4: JPA 2009-202567.

SUMMARY OF THE INVENTION

Problems to be Solved by the Invention

Under the foregoing circumstances, an object of the present invention is to provide a polyamide resin that has high heat resistance and that is less susceptible to decomposition and excellent in moldability and mechanical properties.

Means for Solving the Problems

As a result of careful studies to attain the above object, we accomplished the present invention on the basis of the finding that polyamide resins comprising a diamine component containing p-xylylenediamine as a major constituent combined with m-xylylenediamine and a dicarboxylic acid component containing adipic acid as a major constituent optionally combined with straight chain aliphatic dicarboxylic acids such as sebacic acid and having a specific molecular weight and melting point wherein the molar ratio of the diamine component to the dicarboxylic acid component reacted is equal to or below a specific value fulfill the above object.

Thus, a first aspect of the present invention provides a polyamide resin comprising a diamine unit containing 70 mol % or more of a xylylenediamine unit and a dicarboxylic acid unit containing 70 mol % or more of a straight chain aliphatic dicarboxylic acid unit, wherein the xylylenediamine unit is composed of 50 to 95 mol % of p-xylylenediamine and 50 to 5 mol % of m-xylylenediamine;

the straight chain aliphatic dicarboxylic acid unit is composed of 50 to 100 mol % of adipic acid and 0 to less than 50 mol % of sebacic acid or other straight chain aliphatic dicarboxylic acids; the molar ratio of reacted diamine units to reacted dicarboxylic acid units (the number of moles of reacted diamine units/the number of moles of reacted dicarboxylic acid units) is less than 0.994; and the polyamide resin has a number average molecular weight of 10,000 to 25,000 and a melting point of 285° C. or more.

A second aspect of the present invention provides the polyamide resin according to the first aspect, which has a terminal amino group concentration of 10 to 100 μeq/g.

A third aspect of the present invention provides the polyamide resin according to the first aspect, which has a terminal carboxyl group concentration of 50 to 200 μeq/g.

A fourth aspect of the present invention provides the polyamide resin according to the first aspect, wherein the ratio of the terminal amino group concentration to the terminal carboxyl group concentration ([NH$_2$]/[COOH]) is 0.6 or less.

A fifth aspect of the present invention provides the polyamide resin according to the first aspect, which has a melting point of higher than 300° C.

A sixth aspect of the present invention provides a heat-resistant part obtained by molding the polyamide resin according to the first aspect.

A seventh aspect of the present invention provides the heat-resistant part according to the sixth aspect, which is a reflector for LED, an LED mounting board or a heat sink element.

An eighth aspect of the present invention provides a process for molding a polyamide resin comprising a diamine unit containing 70 mol % or more of a xylylenediamine unit and a dicarboxylic acid unit containing 70 mol % or more of a straight chain aliphatic dicarboxylic acid unit, wherein the xylylenediamine unit is composed of 50 to 95 mol % of p-xylylenediamine and 50 to 5 mol % of m-xylylenediamine; the straight chain aliphatic dicarboxylic acid unit is composed of 50 to 100 mol % of adipic acid and 0 to less than 50 mol % of sebacic acid or other straight chain aliphatic dicarboxylic acids; the molar ratio of reacted diamine units to reacted dicarboxylic acid units (the number of moles of reacted diamine units/the number of moles of reacted dicarboxylic acid units) is less than 0.994;

the polyamide resin has a number average molecular weight of 10,000 to 25,000 and a melting point of 285° C. or more; and the process comprises melt-molding the polyamide resin in an extruder or molding machine to subject the polyamide resin to further amidation reaction.

A ninth aspect of the present invention provides the process for molding a polyamide resin according to the eighth aspect, wherein the number average molecular weight of the polyamide resin after melt molding increases by 0.5 to 50% relative to the number average molecular weight before melt molding.

Advantages of the Invention

According to the present invention, polyamide resins that have high heat resistance and that are less susceptible to decomposition and excellent in moldability and mechanical properties can be consistently provided.

Further, the polyamide resins of the present invention can be converted into polyamide resin moldings having excellent heat resistance and mechanical properties by a molding process involving melt molding for further amidation reaction in an extruder or a molding machine to increase the molecular weight.

Molded articles obtained by molding the polyamide resins of the present invention are expected for use in the fields of highly heat-resistant parts to which polyamide resins could not be applied so far, including, for example, reflectors for LED, LED mounting boards or heat sink elements.

The reason why such characteristics as resistance to decomposition are provided may be attributed to the fact that the polyamide resins of the present invention are prevented from heat-induced decomposition during molding by selecting a low ratio of the number of moles of the diamine component/the number of moles of the dicarboxylic acid component of less than 0.994 to contain terminal carboxyl groups in excess of terminal amino groups in contrast to conventional polyamide resins consisting of a diamine and a dicarboxylic acid that are synthesized by polymerizing the diamine component and the dicarboxylic acid component in around 1:1 to increase the molecular weight. Also, it is thought that highly heat-resistant moldings having excellent mechanical properties such as flexural strength can be obtained because amidation reaction further proceeds in a molding machine to increase the molecular weight.

THE BEST MODE FOR CARRYING OUT THE INVENTION

The polyamide resins of the present invention are polyamide resins comprising a diamine unit containing 70 mol % or more of a xylylenediamine unit and a dicarboxylic acid unit containing 70 mol % or more of a straight chain aliphatic dicarboxylic acid unit, characterized in that:

the xylylenediamine unit is composed of 50 to 95 mol % of p-xylylenediamine and 50 to 5 mol % of m-xylylenediamine; the straight chain aliphatic dicarboxylic acid unit is composed of 50 to 100 mol % of adipic acid and 0 to less than 50 mol % of sebacic acid or other straight chain aliphatic dicarboxylic acids; the molar ratio of reacted diamine units to reacted dicarboxylic acid units (the number of moles of reacted diamine units/the number of moles of reacted dicarboxylic acid units) is less than 0.994; and they have a number average molecular weight of 10,000 to 25,000 and a melting point of 285° C. or more.

The polyamide resins of the present invention and the processes for molding the polyamide resins will now be explained in detail below.

As used herein, the term "to" means to include the values indicated before and after it as lower and upper limits unless otherwise specified.

The diamine unit of the polyamide resins of the present invention is derived from a diamine component containing 70 mol % or more of xylylenediamine and the xylylenediamine is composed of 50 to 95 mol % of p-xylylenediamine and 50 to 5 mol % of m-xylylenediamine.

If the xylylenediamine is less than 70 mol %, heat resistance and chemical resistance decrease. The xylylenediamine is preferably 80 mol %, more preferably 90 mol %, even more preferably 95 mol %, especially 98 mol %.

If p-xylylenediamine is less than 50 mol % (i.e., m-xylylenediamine is more than 50 mol %) in the xylylenediamine, heat resistance and crystallinity decrease, but if it exceeds 95 mol % (i.e., m-xylylenediamine is less than 5 mol %), moldability deteriorates.

Preferred proportions consist of 55 to 95 mol % of p-xylylenediamine and 45 to 5 mol % of m-xylylenediamine.

The dicarboxylic acid unit of the polyamide resins of the present invention is derived from a dicarboxylic acid component containing 70 mol % or more of a straight chain aliphatic dicarboxylic acid and the straight chain aliphatic dicarboxylic acid is composed of 50 to 100 mol % of adipic acid and 0 to less than 50 mol % of sebacic acid or other straight chain aliphatic dicarboxylic acids.

If the proportions are in these ranges, polyamide resins having good heat resistance and high moldability can be obtained.

Preferred dicarboxylic acids for use as straight chain aliphatic dicarboxylic acids other than adipic acid and sebacic acid are straight chain aliphatic $\alpha,\omega$-dicarboxylic acids containing 4 to 20 carbon atoms, e.g., aliphatic dicarboxylic acids such as succinic acid, glutaric acid, pimelic acid, suberic acid, azelaic acid, undecanoic diacid, dodecanoic diacid and the like, and they can be used alone or as a mixture of two or more of them.

Preferred proportions of straight chain aliphatic dicarboxylic acids consist of 55 to 100 mol % of adipic acid, 45 to 0 mol % of sebacic acid and less than 50 mol % to 0 mol % of other straight chain aliphatic dicarboxylic acids.

Examples of diamines other than p-xylylenediamine and m-xylylenediamine that can be used in the range of less than 30 mol % of diamines as starting diamines of the polyamide resins may include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decane (including structural isomers thereof) and bis(aminomethyl)tricyclodecane (including structural isomers thereof); diamines having an aromatic ring such as bis(4-aminophenyl)ether, p-phenylenediamine, p-xylylenediamine and bis(aminomethyl)

naphthalene (including structural isomers thereof) and the like; and they can be used alone or as a mixture of two or more of them.

When a diamine other than p-xylylenediamine and m-xylylenediamine is used as a starting diamine, it should be used at a proportion of less than 30 mol %, preferably 1 to 25 mol %, especially preferably 5 to 20 mol % of the diamine structural unit.

Examples of dicarboxylic acids other than straight chain aliphatic dicarboxylic acids that can be used in the range of less than 30 mol % of dicarboxylic acids include phthalic acid compounds such as isophthalic acid, terephthalic acid and orthophthalic acid;

isomeric naphthalenedicarboxylic acids such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid and 2,7-naphthalenedicarboxylic acid and the like; and they can be used alone or as a mixture of two or more of them. Monocarboxylic acids such as benzoic acid, propionic acid and butyric acid; polycarboxylic acids such as trimellitic acid and pyromellitic acid; carboxylic anhydrides such as trimellitic anhydride and pyromellitic anhydride and the like can also be used.

A preferred dicarboxylic acid for use as a dicarboxylic acid other than straight chain aliphatic dicarboxylic acids is isophthalic acid because of moldability. The proportion of isophthalic acid is less than 30 mol %, preferably 1 to 25 mol %, especially preferably 5 to 20 mol % of the dicarboxylic acid structural unit.

The polyamide resins of the present invention preferably have a terminal amino group concentration of 10 to 100 µeq/g, more preferably 15 to 70 µeq/g, even more preferably 20 to 50 µeq/g and preferably have a terminal carboxyl group concentration of 50 to 200 µeq/g, more preferably 60 to 170 µeq/g, even more preferably 70 to 150 µeq/g.

By controlling the terminal amino group concentration and terminal carboxyl group concentration in the above ranges, the polyamide resins tend to show a molecular weight in a suitable range, better mechanical properties, and resistance to decomposition and decreased gas emission during molding, thereby improving moldability.

The ratio of the terminal amino group concentration to the terminal carboxyl group concentration ([$NH_2$]/[COOH]) is preferably 0.7 or less, more preferably 0.6 or less, especially preferably 0.5 or less. Polyamide resins with this ratio of greater than 0.6 tend to be poor in heat resistance and susceptible to discoloration or gas emission during molding.

The terminal amino group concentration can be determined by dissolving 0.5 g of a polyamide resin in 30 ml of a phenol/methanol (4:1) mixed solution with stirring at 20 to 30° C. and titrating the solution with 0.01N hydrochloric acid. Similarly, the terminal carboxyl group concentration can be calculated as follows: 0.1 g of a polyamide resin is dissolved in 30 ml of benzyl alcohol at 200° C. and 0.1 ml of a phenol red solution is added in the range of 160° C. to 165° C. This solution is titrated with a titration solution of 0.132 g of KOH in 200 ml of benzyl alcohol (0.01 mol/l expressed as KOH content) until the endpoint is reached at which the color changes from yellow to red completely.

The polyamide resins of the present invention have a melting point of 285° C. or more, preferably 290° C. or more, more preferably 295° C. or more, even more preferably 300° C. or more, especially preferably 305° C. or more. The upper limit is preferably about 340° C., more preferably 335° C. or less, even more preferably 330° C. or less, especially 320° C. or less. By selecting the melting point in the above ranges, heat resistance improves.

The glass transition point of the polyamide resins is preferably in the range of 60° C. to 120° C., more preferably 65° C. to 110° C., especially 70° C. to 100° C.

As used herein, the melting point and glass transition point of a polyamide resin refer to the melting point and glass transition point that can be determined by differential scanning calorimetry (DSC) by melting a sample by heating it once to eliminate the influence of thermal history on crystallinity and then heating it again. Specifically, a polyamide resin sample is melted by heating from 30° C. to a temperature equal to or higher than an expected melting point at a rate of 10° C./min, and then rapidly cooled. Then, the sample is heated at a rate of 10° C./min to a temperature equal to or higher than the melting point, whereby the melting point and glass transition point can be determined.

The polyamide resins of the present invention also have a number average molecular weight of 10,000 to 25,000, preferably 11,000 to 24,000, even more preferably 12,000 to 23,000. When it is in such ranges, the resulting moldings have good mechanical strength and moldability improves.

The number average molecular weight here is calculated from the terminal amino group concentration [$NH_2$] (µeq/g) and the terminal carboxyl group concentration [COOH] (µeq/g) of a polyamide resin by the equation below:

$$\text{Number average molecular weight} = 2{,}000{,}000/([\text{COOH}]+[\text{NH}_2]).$$

The polyamide resins of the present invention have a molar ratio of reacted diamine units to reacted dicarboxylic acid units (the number of moles of reacted diamine units/the number of moles of reacted dicarboxylic acid units; hereinafter sometimes referred to as "reaction molar ratio") of less than 0.994, preferably less than 0.993, more preferably less than 0.992, especially less than 0.991, and the lower limit is preferably 0.970 or more, more preferably 0.975 or more, even more preferably 0.980 or more, especially 0.985 or more.

By controlling the reaction molar ratio at less than 0.994, the polyamide resins of the present invention resist decomposition of the resins during molding and have consistent flowability. This also helps amidation reaction to proceed in an optimal range but not excessively during melt molding for further amidation reaction in an extruder or a molding machine. If the molar ratio is 0.994 or more, resins may readily decompose to emit gas during molding.

The reaction molar ratio (r) here is determined by the equation below:

$$r = (1 - cN - b(C-N))/(1 - cC + a(C-N))$$

wherein:
a: M1/2
b: M2/2
c: 18.015 (the molecular weight of water)
M1: the molecular weight of the diamine (g/mol)
M2: the molecular weight of the dicarboxylic acid (g/mol)
N: terminal amino group concentration (eq/g)
C: terminal carboxyl group concentration (eq/g).

It should be understood that when a polyamide resin is synthesized from diamine and dicarboxylic acid monomers having different molecular weights, M1 and M2 are calculated depending on the proportions (molar ratio) of the starting monomers. It should also be understood that if the synthesis vessel is a completely closed system, the molar ratio of loaded monomers equals the reaction molar ratio, but the inlet molar ratio does not always equal the reaction molar ratio because the actual synthesizer cannot be a completely closed system. Moreover, the inlet molar ratio does not always equal the reaction molar ratio because loaded monomers may not completely react. Thus, the reaction molar ratio refers to the molar ratio of actually reacted monomers determined from the terminal group concentrations of a finished polyamide resin.

The reaction molar ratio of the polyamide resins can also be controlled by appropriately selecting reaction conditions such as the inlet molar ratio of starting dicarboxylic acid and diamine, reaction period, reaction temperature, the speed at which xylylenediamine is added dropwise, the degree of vacuum in the vessel, the timing of starting depressurization and the like. When the polyamide resins are prepared by the so-called salt process, a reaction molar ratio of less than 0.994 may be achieved specifically by selecting a ratio of a starting diamine/a starting dicarboxylic acid of less than 0.994 and allowing the reaction to proceed sufficiently far, for example. In the case of a process involving continuous dropwise addition of a diamine to a molten dicarboxylic acid, it may be achieved by not only selecting a loading ratio of less than 0.994 but also controlling the amount of the diamine to be refluxed during the dropwise addition of the diamine and removing the added diamine outside the reaction system. Specifically, the diamine may be removed outside the system by controlling the temperature in the reflux column in an optimal range or appropriately controlling the shapes and amounts of packings in the packed column such as so-called Raschig rings, Lessing rings and saddles. Alternatively, unreacted diamine can also be removed outside the system by shortening the reaction period after dropwise addition of the diamine. Further, unreacted diamine can also be removed outside the system as appropriate by controlling the speed at which the diamine is added dropwise. These methods allow the reaction molar ratio to be controlled in a predetermined range even if the loading ratio is higher than 0.994.

The polyamide resins of the present invention are obtained by poly condensing a diamine component containing 70 mol % or more of xylylenediamine and a dicarboxylic acid component containing 70 mol % or more of adipic acid, sebacic acid or other straight chain aliphatic dicarboxylic acids and they are prepared by using any of previously known processes and polymerization conditions including, but not specifically limited to, atmospheric pressure melt polymerization, high pressure melt polymerization and the like.

For example, they are prepared by heating a polyamide salt composed of p-xylylenediamine, m-xylylenediamine and adipic acid (and optionally sebacic acid and the like) in the presence of water under pressure to polymerize it in the molten state while removing the water added and condensed water. They may also be prepared by directly adding p-xylylenediamine and m-xylylenediamine to adipic acid (and optionally sebacic acid and the like) in the molten state to poly condense them at atmospheric pressure. In the latter case, polycondensation proceeds by continuously adding p-xylylenediamine and m-xylylenediamine while heating the reaction system to a reaction temperature equal to or higher than the melting points of the oligoamide and polyamide produced to prevent the reaction system from solidifying.

When the polyamide resins are to be obtained by polycondensation, lactams such as ε-caprolactam, ω-laurolactam and ω-enantolactam; amino acids such as 6-aminocaproic acid, 7-aminoheptanoic acid, 11-aminoundecanoic acid, 12-aminododecanoic acid, 9-aminononanoic acid and p-aminomethylbenzoic acid and the like may be added to the polycondensation reaction system so far as the performance is not affected.

In the present invention, the polyamide resins described above can be converted into highly heat-resistant moldings having excellent mechanical properties such as flexural strength with an increased molecular weight by melt-molding them in an extruder or a molding machine to allow amidation reaction to further proceed. The melt molding process is not specifically limited. For example, resin pellets can be prepared from a polyamide resin of the present invention by further melt-kneading a dry blend optionally mixed with other ingredients. Especially, melt kneading is preferably performed by using various conventional extruders such as single or twin-screw extruders, especially preferably twin-screw extruders because of productivity, versatility and the like. In this case, melt kneading is preferably performed under controlled conditions at a temperature of 290 to 340° C. for a residence time of 10 min or less by using a screw having at least one or more, preferably two or more reverse helix screw elements and/or kneading discs on which the polyamide resin partially stays.

When the polyamide resins are prepared into molded articles of various shapes by various conventional molding processes such as e.g., injection molding, injection compression molding, hollow molding, extrusion molding, sheet molding and the like, amidation reaction can also be allowed to proceed by melt kneading. By these molding processes, the molecular weight increases so that highly heat-resistant molded articles having excellent mechanical properties such as flexural strength can be obtained. Preferably, the molding temperature is 290 to 340° C. and the residence time is 10 min or less during these processes.

By controlling the temperature during melt kneading by an extruder and the molding temperature during molding in the above ranges, the amidation reaction of the polyamide resins is promoted so that the amidation reaction yield increases and the molecular weight tends to increase. This improves mechanical properties of molded articles prepared from the polyamide resins. By selecting a screw and an extrusion temperature in the above ranges, insufficient kneading by an extruder or decomposition of the resins is less likely to occur so that the polyamide resins tend to be prevented from degradation and discoloration.

The amidation reaction yield of the polyamide resins before melt molding, i.e. the polyamide resins after polymerization is preferably 0.985 to 0.998, more preferably 0.990 to 0.997. The amidation reaction yield after melt molding is preferably 0.986 to 0.998. If one attempts to achieve an amidation reaction yield of 0.998 or more in polymerization, the polyamide resin will undergo an excessive thermal history during polymerization, with the undesirable result that the polyamide resin may be deteriorated by the heat applied to the polyamide resin during the subsequent molding process or the polyamide resin may be discolored during polymerization. By controlling the amidation reaction yield in such ranges, polyamide resins having good moldability with less gas emission during molding can be obtained.

As used herein, the amidation reaction yield (P) refers to the ratio of reacted monomers and can be calculated from the reaction molar ratio, the number average molecular weight and the molecular weights of water and monomers in cases of polyamide resins composed of a diamine and a dicarboxylic acid, and specifically it can be calculated by the equation below:

$$\text{Amidation reaction yield}(P) = (Mn + r(Mn - M1) - M2)/(2r(Mn - c))$$

wherein:
Mn: number average molecular weight
r: reaction molar ratio c: 18.015 (the molecular weight of water)
M1: the molecular weight of the diamine (g/mol)
M2: the molecular weight of the dicarboxylic acid (g/mol).

The number average molecular weight of the polyamide resins after melt molding preferably increases by 0.5 to 50% relative to the number average molecular weight before melt molding. The increase rate of a molecular weight is defined as the increase rate (%) of the number average molecular weight after molding relative to the number average molecular weight before molding, more preferably 1 to 40%, even more preferably 3 to 30%, especially 5 to 20%.

Molded articles obtained by using the polyamide resins of the present invention include various moldings such as films, sheets, laminated films, laminated sheets, tubes, hoses, pipes, profile extrusions, hollow containers, bottles, fibers, parts of various shapes and the like.

Molded articles obtained by using the polyamide resins of the present invention can be used as parts for various applications requiring heat resistance including electric/electronic equipment parts, parts of vehicles such as automobiles, general machine parts, precision machine parts and the like, especially they can be conveniently used as reflectors for LED, LED mounting boards or heat sink elements or the like.

The polyamide resins of the present invention may contain a phosphorus compound to improve processing stability during melt molding or to prevent the polyamide resins from discoloration. Phosphorus compounds containing an alkali metal or alkaline earth metal are conveniently used, including for example phosphate salts, hypophosphite salts and phosphite salts of sodium, magnesium, calcium and the like. Among them, hypophosphite salts of alkali metals or alkaline earth metals are preferably contained because they are especially useful for preventing the polyamide resins from discoloration. When a phosphorus compound is used, it is desirably contained in a polyamide resin at 1 ppm or more and 200 ppm or less, preferably 5 ppm or more and 160 ppm or less, even more preferably 10 ppm or more and 100 ppm or less expressed as the phosphorus atom concentration in the polyamide resin finally obtained.

In addition to the phosphorus compounds described above, the polyamide resins of the present invention may further contain various materials including, but not limited to, additives such as lubricants, matting agents, heat stabilizers, weather stabilizers, UV absorbers, nucleating agents, plasticizers, flame retardants, antistatic agents, discoloration inhibitors, anti-gelling agents and the like so far as the benefits of the present invention are not affected.

The polyamide resins of the present invention preferably contain a carbodiimide compound. Carbodiimide compounds preferably include aromatic, aliphatic or alicyclic polycarbodiimide compounds prepared by various processes. Among them, aliphatic or alicyclic polycarbodiimide compounds are preferred in terms of melt kneadability during extrusion or the like, and alicyclic polycarbodiimide compounds are more preferably used.

These carbodiimide compounds can be prepared by decarboxylative condensation of organic polyisocyanates. For example, they can be synthesized by decarboxylative condensation of various organic polyisocyanates at a temperature of about 70° C. or more in an inert solvent or without using a solvent in the presence of a carbodiimidation catalyst. The isocyanate content is preferably 0.1 to 5%, more preferably 1 to 3%. The content in the above ranges tends to facilitate the reaction with the polyamide resins and to improve hydrolysis resistance.

Organic polyisocyanates that can be used as starting materials for synthesizing the carbodiimide compounds include, for example, various organic diisocyanates such as aromatic diisocyanates, aliphatic diisocyanates and alicyclic diisocyanates and mixtures thereof.

Examples of organic diisocyanates specifically include 1,5-naphthalene diisocyanate, 4,4'-diphenylmethanediisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, hexamethylene diisocyanate, cyclohexane-1,4-diisocyanate, xylylene diisocyanate, isophorone diisocyanate, dicyclohexylmethane-4,4-diisocyanate, methylcyclohexane diisocyanate, tetramethylxylylene diisocyanate, 2,6-diisopropylphenyl isocyanate, 1,3,5-triisopropylbenzene-2,4-diisocyanate, methylenebis(4,1-cyclohexylene)diisocyanate and the like, and two or more of them can be used in combination. Among them, dicyclohexylmethane-4,4-diisocyanate and methylenebis(4,1-cyclohexylene)diisocyanate are preferred.

To cap the ends of the carbodiimide compounds to control their degree of polymerization, end capping agents such as monoisocyanates are also preferably used. Monoisocyanates include, for example, phenyl isocyanate, tolyl isocyanate, dimethylphenyl isocyanate, cyclohexyl isocyanate, butyl isocyanate, naphthyl isocyanate and the like, and two or more of them can be used in combination.

The end-capping agents are not limited to the monoisocyanates mentioned above, but may be any active hydrogen compounds capable of reacting with isocyanates. Examples of such active hydrogen compounds may include aliphatic, aromatic or alicyclic compounds having an —OH group such as methanol, ethanol, phenol, cyclohexanol, N-methylethanolamine, polyethylene glycol monomethyl ether and polypropylene glycol monomethyl ether; secondary amines such as diethylamine and dicyclohexylamine; primary amines such as butylamine and cyclohexylamine; carboxylic acids such as succinic acid, benzoic acid and cyclohexanecarboxylic acid; thiols such as ethyl mercaptan, allyl mercaptan and thiophenol; compounds having an epoxy group and the like, and two or more of them can be used in combination.

Carbodiimidation catalysts that can be used include, for example, phospholene oxides such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide and 3-phospholene isomers thereof; metal catalysts such as tetrabutyl titanate and the like, among which 3-methyl-1-phenyl-2-phospholene-1-oxide is preferred because of reactivity. Two or more of the carbodiimidation catalysts may be used in combination.

The content of the carbodiimide compounds is preferably 0.1 to 2 parts by mass, more preferably 0.2 to 1.5 parts by mass, even more preferably 0.3 to 1.5 parts by mass per 100 parts by mass of a polyamide resin. If it is less than 0.1 part by mass, hydrolysis resistance is insufficient so that uneven delivery is more likely to occur during melt kneading such as extrusion, leading to insufficient melt kneading. If it exceeds 2 parts by mass, however, the viscosity during melt kneading significantly increases, which may result in low melt kneadability and moldability.

The polyamide resins of the present invention also preferably contain a stabilizer. Stabilizers preferably include, for example, organic stabilizers such as phosphorus stabilizers, hindered phenol stabilizers, hindered amine stabilizers, organic sulfur stabilizers, oxanilide stabilizers and secondary aromatic amine stabilizers; and inorganic stabilizers such as copper compounds and halides. Phosphorus stabilizers preferably include phosphite compounds and phosphonite compounds.

Phosphite compounds include, for example, distearylpentaerythritol diphosphite, dinonylphenylpentaerythritol diphosphite, bis(2,4-di-t-butylphenyl)pentaerythritol diphosphite, bis(2,6-di-t-butyl-4-methylphenyl)pentaerythritol diphosphite, bis(2,6-di-t-butyl-4-ethylphenyl)pentaerythritol diphosphite, bis(2,6-di-t-butyl-4-isopropylphenyl)pentaerythritol diphosphite, bis(2,4,6-tri-t-butylphenyl)pentaerythritol diphosphite, bis(2,6-di-t-butyl-4-sec-butylphenyl)pentaerythritol diphosphite, bis(2,6-di-t-butyl-4-t-octylphenyl)pentaerythritol diphosphite, bis(2,4-dicumylphenyl)pentaerythritol diphosphite and the like, among which bis(2,6-di-t-butyl-4-methylphenyl)pentaerythritol diphosphite and bis(2,4-dicumylphenyl)pentaerythritol diphosphite are preferred.

Phosphonite compounds include, for example, tetrakis(2, 4-di-t-butylphenyl)-4,4'-biphenylene diphosphonite, tetrakis (2,5-di-t-butylphenyl)-4,4'-biphenylene diphosphonite, tetrakis(2,3,4-trimethylphenyl)-4,4'-biphenylene diphosphonite, tetrakis(2,3-dimethyl-5-ethylphenyl)-4,4'-biphenylene diphosphonite, tetrakis(2,6-di-t-butyl-5-ethylphenyl)-4,4'-biphenylene diphosphonite, tetrakis(2,3,4-tributylphenyl)-4,4'-biphenylene diphosphonite, tetrakis(2,4,6-tri-t-butylphenyl)-4,4'-biphenylene diphosphonite and the like, among which tetrakis(2,4-di-t-butylphenyl)-4,4'-biphenylene diphosphonite is preferred.

Hindered phenol stabilizers include, for example, n-octadecyl-3-(3,5-di-t-butyl-4-hydroxyphenyl)propionate, 1,6-hexanediol bis[3-(3,5-di-t-butyl-4-hydroxyphenyl)propionate], pentaerythritol tetrakis[3-(3,5-di-t-butyl-4-hydroxyphenyl)propionate], 3,9-bis[1,1-dimethyl-2-{β-(3-t-butyl-4-hydroxy-5-methylphenyl)propionyloxy}ethyl]-2,4, 8,10-tetraoxaspiro[5,5]undecane, triethylene glycol bis[3-(3-t-butyl-5-methyl-4-hydroxyphenyl)propionate], 3,5-di-t-butyl-4-hydroxybenzyl phosphonate diethyl ester, 1,3,5-trimethyl-2,4,6-tris(3,5-di-t-butyl-4-hydroxybenzyl) benzene, 2,2-thiodiethylenebis[3-(3,5-di-t-butyl-4-hydroxyphenyl)propionate], tris(3,5-di-t-butyl-4-hydroxybenzyl)isocyanurate, N,N'-hexamethylenebis(3,5-di-t-butyl-4-hydroxyhydrocinnamide) and the like. Among them, n-octadecyl-3-(3,5-di-t-butyl-4-hydroxyphenyl)propionate, 1,6-hexanediolbis[3-(3,5-t-butyl-4-hydroxyphenyl) propionate], pentaerythritol tetrakis[3-(3,5-di-t-butyl-4-hydroxyphenyl)propionate], 3,9-bis[1,1-dimethyl-2-{β-(3-t-butyl-4-hydroxy-5-methylphenyl)propionyloxy}ethyl]-2,4, 8,10-tetraoxaspiro[5,5]undecane and N,N'-hexamethylenebis(3,5-di-t-butyl-4-hydroxyhydrocinnamide) are preferred.

Hindered amine stabilizers include, for example, well-known hindered amine compounds having a 2,2,6,6-tetramethylpiperidine skeleton. Specific examples of hindered amine compounds include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-phenylacetoxy-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-ethylcarbamoyloxy-2,2,6,6-tetramethylpiperidine, 4-cyclohexylcarbamoyloxy-2,2,6,6-tetramethylpiperidine, 4-phenylcarbamoyloxy-2,2,6,6-tetramethylpiperidine, bis(2,2,6,6-tetramethyl-4-piperidyl) carbonate, bis(2,2,6,6-tetramethyl-4-piperidyl)oxalate, bis (2,2,6,6-tetramethyl-4-piperidyl)malonate, bis(2,2,6,6-tetramethyl-4-piperidyl)sebacate, bis(2,2,6,6-tetramethyl-4-piperidyl)adipate, bis(2,2,6,6-tetramethyl-4-piperidyl) terephthalate, 1,2-bis(2,2,6,6-tetramethyl-4-piperidyloxy) ethane, α,α'-bis(2,2,6,6-tetramethyl-4-piperidyloxy)-p-xylene, bis(2,2,6,6-tetramethyl-4-piperidyltolylene)-2,4-dicarbamate, bis(2,2,6,6-tetramethyl-4-piperidyl) hexamethylene-1,6-dicarbamate, tris(2,2,6,6-tetramethyl-4-piperidyl)benzene-1,3,5-tricarboxylate, tris(2,2,6,6-tetramethyl-4-piperidyl)benzene-1,3,4-tricarboxylate, 1-[2-{3-(3,5-di-t-butyl-4-hydroxyphenyl)propionyloxy}butyl]-4-[3-(3,5-di-t-butyl-4-hydroxyphenyl)propionyloxy]-2,2,6,6-tetramethylpiperidine, the condensation product of 1,2,3,4-butanetetracarboxylic acid and 1,2,2,6,6-pentamethyl-4-piperidinol and β,β,β',β'-tetramethyl-3,9-[2,4,8,10-tetraoxaspiro(5,5)undecane]diethanol, the polycondensation product of dimethyl succinate and 1-(2-hydroxyethyl)-4-hydroxy-2,2,6,6-tetramethylpiperidine, 1,3-benzenedicarboxamide-N,N'-bis(2,2,6,6-tetramethyl-4-piperidyl) and the like.

Commercially available hindered amine compounds include the products available from ADEKA CORPORATION under the brand names "ADKSTABLA-52, LA-57, LA-62, LA-67, LA-63P, LA-68LD, LA-77, LA-82, LA-87"; the products available from Ciba Specialty Chemicals Inc. under the brand names "TINUVIN 622, 944, 119, 770, 144"; the product available from Sumitomo Chemical Company under the brand name "SUMISORB 577"; the products available from American Cyanamid Company under the brand names "CYASORB UV-3346, 3529, 3853"; and the product available from Clariant (Japan) K.K. under the brand name "Nylostab S-EED", etc.

Organic sulfur stabilizers include, for example, organic thioate compounds such as didodecyl thiodipropionate, ditetradecyl thiodipropionate, dioctadecyl thiodipropionate, pentaerythritol tetrakis(3-dodecylthiopropionate) and thiobis(N-phenyl-β-naphthylamine); mercaptobenzimidazole compounds such as 2-mercaptobenzothiazole, 2-mercaptobenzimidazole, 2-mercaptomethylbenzimidazole and metal salts of 2-mercaptobenzimidazole; dithiocarbamate compounds such as metal salts of diethyldithiocarbamic acid and metal salts of dibutyldithiocarbamic acid; and thiourea compounds such as 1,3-bis(dimethylaminopropyl)-2-thiourea and tributylthiourea; as well as tetramethylthiuram monosulfide, tetramethylthiuram disulfide, nickel dibutyl dithiocarbamate, nickel isopropyl xanthate, trilauryl trithiophosphite and the like.

Among them, mercaptobenzimidazole compounds, dithiocarbamate compounds, thiourea compounds and organic thioate compounds are preferred, among which mercaptobenzimidazole compounds and organic thioate compounds are more preferred. Especially, thioether compounds having a thioether structure can be conveniently used because they accept oxygen from oxidized materials to reduce it. Specifically, 2-mercaptobenzimidazole, 2-mercaptomethylbenzimidazole, ditetradecyl thiodipropionate, dioctadecyl thiodipropionate and pentaerythritol tetrakis(3-dodecylthiopropionate) are more preferred, among which ditetradecyl thiodipropionate, pentaerythritol tetrakis(3-dodecylthiopropionate) and 2-mercaptomethylbenzimidazole are still more preferred, and pentaerythritoltetrakis(3-dodecylthiopropionate) is especially preferred.

The organic sulfur compounds typically have a molecular weight of 200 or more, preferably 500 or more and typically up to 3,000.

Oxanilide stabilizers preferably include 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxanilide, 2-ethoxy-5-tert-butyl-2'-ethoxanilide and mixtures thereof with 2-ethoxy-2'-ethyl-5, 4'-di-tert-butoxanilide, mixtures of o- and p-methoxydisubstituted oxanilides, mixtures of o- and p-ethoxy-disubstituted oxanilides and the like.

Secondary aromatic amine stabilizers preferably include compounds having a diphenylamine skeleton, compounds having a phenylnaphthylamine skeleton and compounds having a dinaphthylamine skeleton, more preferably compounds having a diphenylamine skeleton and compounds having a phenylnaphthylamine skeleton. Specifically, compounds having a diphenylamine skeleton include p,p'-dialkyldiphenylamine (wherein the alkyl group contains 8 to 14 carbon atoms), octylated diphenylamine, 4,4'-bis($\alpha,\alpha$-dimethylbenzyl)diphenylamine, p-(p-toluenesulfonylamide)diphenylamine, N,N'-diphenyl-p-phenylenediamine, N-phenyl-N'-isopropyl-p-phenylenediamine, N-phenyl-N'-(1,3-dimethylbutyl)-p-phenylenediamine and N-phenyl-N'-(3-methacryloyloxy-2-hydroxypropyl)-p-phenylenedi amine; compounds having a phenylnaphthylamine skeleton include N-phenyl-1-naphthylamine and N,N'-di-2-naphtyl-p-phenylenediamine; and compounds having a dinaphthylamine skeleton include 2,2'-dinaphthylamine, 1,2'-dinaphthylamine and 1,1'-dinaphthylamine. Among them, 4,4'-bis($\alpha,\alpha$-dimethylbenzyl)diphenylamine, N,N'-di-2-naphtyl-p-phenylenediamine and N,N'-diphenyl-p-phenylenediamine are more preferred, among which N,N'-di-2-naphtyl-p-phenylenediamine and 4,4'-bis($\alpha,\alpha$-dimethylbenzyl)diphenylamine are especially preferred.

Inorganic stabilizers preferably include copper compounds and halides.

Copper compounds are copper salts of various inorganic or organic acids excluding the halides described below. Copper may be either cuprous or cupric, and specific examples of copper salts include copper chloride, copper bromide, copper iodide, copper phosphate, copper stearate as well as natural minerals such as hydrotalcite, stichitite and pyrolite.

Halides used as inorganic stabilizers include, for example, alkali metal or alkaline earth metal halides; ammonium halides and quaternary ammonium halides of organic compounds; and organic halides such as alkyl halides and aryl halides, specific examples of which include ammonium iodide, stearyl triethyl ammoniumbromide, benzyl triethyl ammonium iodide and the like. Among them, alkali metal halide salts such as potassium chloride, sodium chloride, potassium bromide, potassium iodide and sodium iodide are preferred.

Combinations of copper compounds and halides, especially combination of copper compounds and alkali metal halide salts are preferred because they provide excellent effects in resistance to heat-induced discoloration and weatherability (light resistance). For example, when a copper compound is used alone, the molding may be discolored in reddish brown by copper, which is not preferred for use in some applications. However, the discoloration in reddish brown can be prevented by combining the copper compound with a halide.

In the present invention, organic sulfur stabilizers, secondary aromatic amine stabilizers and inorganic stabilizers are especially preferred among the stabilizers described above in terms of processing stability during melt molding, heat aging resistance, the appearance of molded articles and discoloration prevention.

The content of these stabilizers is typically 0.01 to 1 part by mass, preferably 0.01 to 0.8 parts by mass per 100 parts by mass of a polyamide resin.

The polyamide resins of the present invention also preferably contain inorganic fillers including glass fillers (glass fibers, milled glass fibers (milled fibers), glass flakes, glass beads, etc.), calcium silicate fillers (wollastonite, etc.), mica, talc, kaolin, potassium titanate whiskers, boron nitride, carbon fibers and the like so far as the object of the present invention is not affected, and two or more of them may be used in combination.

EXAMPLES

The following examples further illustrate the present invention, but the present invention should not be construed as being limited solely to the following examples.

Example 1

A reaction vessel equipped with a stirrer, a partial condenser, a total condenser, a thermometer, a dropping funnel and a nitrogen inlet as well as a strand die was charged with precisely weighed 8.767 kg (60 mol) of adipic acid, 17.01 g of calcium hypophosphite ($Ca(PH_2O_2)_2$) 350 ppm expressed as the phosphorus atom concentration in the polyamide resin) and 8.75 g of sodium acetate, and thoroughly purged with nitrogen and then pressurized with nitrogen to 0.3 MPa and heated to 170° C. with stirring to homogeneously melt adipic acid.

To this was added dropwise 8, 172 kg (60 mol) of a 1:9 diamine mixture of m-xylylenediamine and p-xylylenediamine with stirring and the pressure was controlled to 0.5 MPa. During then, the inside of the system was continuously heated to 330° C. while the condensed water generated and some amount of unreacted diamine mixture were removed outside the system through the partial condenser and the total condenser. The temperature in the partial condenser was controlled in the range of 145 to 147° C. After completion of the dropwise addition of the xylylenediamine mixture, melt polymerization reaction was continued at an internal temperature of 330° C. After completion of the dropwise addition of the diamine, the pressure was lowered at a rate of 0.4 MPa/hr to atmospheric pressure over 60 min. Then, the pressure was lowered at a rate of 0.002 MPa/min to 0.08 MPa over 20 min. Then, the reaction was continued at 0.08 MPa until the torque of the stirrer reached a predetermined value. The reaction period at 0.08 MPa was 10 min. Then, the inside of the system was pressurized with nitrogen, and the polymer was collected from the strand die and pelletized to give about 20 kg of a polyamide resin. The resulting pellets were dried in vacuo at 150° C. for 7 hrs.

The melting point (Tm), glass transition point (Tg), number average molecular weight (Mn), reaction molar ratio (r), terminal amino group concentration ($[NH_2]$), terminal carboxyl group concentration ($[COOH]$) and ratio between them ($[NH_2]/[COOH]$) and amidation reaction yield of this polyamide resin were as described in Table 1.

Evaluation methods of these parameters are as follows.

(1) Melting point (Tm) and glass transition point (Tg): Melting point and glass transition point were determined by differential scanning calorimetry (DSC) using DSC-60 available from SHIMADZU CORPORATION as follows: a polyamide resin sample was melted by heating from 30° C. to a temperature equal to or higher than an expected melting point at a rate of 10° C./min, and then rapidly cooled, and then heated at a rate of 10° C./min to a temperature equal to or higher than the melting point.

(2) Number average molecular weight (Mn): Number average molecular weight was calculated by the equation below from the terminal amino group concentration $[NH_2]$ (µeq/g) and the terminal carboxyl group concentration

[COOH] (μeq/g) of the polyamide resin determined by the neutralization titrations described below.

Number average molecular weight=2,000,000/ ([COOH]+[NH$_2$]).

(3) Reaction molar ratio (r):
Reaction molar ratio was determined by the equation below described above.

$r=(1-cN-b(C-N))/(1-cC+a(C-N))$ wherein:
a: M1/2
b: M2/2
c: 18.015
M1: the molecular weight of the diamine (g/mol)
M2: the molecular weight of the dicarboxylic acid (g/mol)
N: terminal amino group concentration (eq/g)
C: terminal carboxyl group concentration (eq/g).

(4) Terminal amino group concentration ([NH$_2$]):
In 30 ml of a phenol/ethanol (4:1) mixed solution was dissolved precisely weighed 0.5 g of the polyamide resin with stirring at 20 to 30° C., and after the polyamide resin was completely dissolved, the solution was titrated with 0.01 N hydrochloric acid to determine the concentration.

(5) Terminal carboxyl group concentration ([COOH]):
In 30 ml of benzyl alcohol was dissolved precisely weighed 0.1 g of the polyamide resin with stirring at 200° C. under a nitrogen stream for about 15 min, and after the polyamide resin was completely dissolved, the solution was cooled to 165° C. under a nitrogen stream, and 0.1 ml of a phenol red solution was added with stirring. The solution was held at 160 to 165° C. and titrated with a titration solution of 0.132 g of KOH in 200 ml of benzyl alcohol (0.01 mol/l expressed as KOH content) until the endpoint was reached at which the color of the solution changed from yellow to red completely, and the concentration was determined at that point.

(6) Terminal amino group concentration/terminal carboxyl group concentration ([NH$_2$]/[COOH]):
Calculated from both concentrations described above.

(7) Amidation reaction yield (P):
Determined by the equation below described above.

$P=(Mn+r(Mn-M1)-M2)/(2r(Mn-c))$ wherein:
Mn: number average molecular weight
r: reaction molar ratio
c: 18.015 (the molecular weight of water)
M1: the molecular weight of the diamine (g/mol)
M2: the molecular weight of the dicarboxylic acid (g/mol).

(Examples 2 to 5 and Comparative examples 1 to 3) Polyamide resins were obtained in the same manner as in Example 1 except that the proportions of m-xylylenediamine and p-xylylenediamine and the proportions of sebacic acid and adipic acid were as described in Table 1.

Evaluation results of the resulting polyamide resins are shown in Table 1 to Table 2.

(Molding evaluation of the polyamide resins of Examples 1 to 5 and Comparative examples 1 to 3)

Then, each polyamide resin obtained in Examples 1 to 5 and Comparative examples 1 to 3 above was blended with 20 ppm calcium stearate as a stabilizer in a tumbler and then processed in an injection molding machine model 100T available from FANUC Ltd. under conditions of a cylinder temperature controlled at the melting point of each polyamide resin plus 20 to 30° C. and a die temperature of 60 to 90° C. to prepare an ISO specimen having a thickness of 4 mm. The specimen was further subjected to heat treatment by holding it at 150° C. for 1 hr.

The specimen obtained was analyzed for flexural modulus of elasticity (GPa) according to JIS K7171 using Strograph available from Toyoseiki Seisaku-sho, Ltd. at a test temperature of 23° C. and a test humidity of 50% RH.

The number average molecular weight of the specimen obtained was also determined by the method described above. The percentage increase (%) of the number average molecular weight after molding relative to the number average molecular weight before molding was also determined.

The results are shown in Table 1 to Table 2.

TABLE 1

|  |  | Examples | | | | |
| --- | --- | --- | --- | --- | --- | --- |
|  |  | 1 | 2 | 3 | 4 | 5 |
| Sebacic acid | mol % |  |  |  |  |  |
| Adipic acid | mol % | 100 | 100 | 100 | 100 | 90 |
| m-xylylenediamine | mol % | 10 | 20 | 30 | 40 | 10 |
| p-xylylenediamine | mol % | 90 | 80 | 70 | 60 | 90 |
| Before Tg | ° C. | 97 | 95 | 94 | 93 | 94 |
| molding Tm | ° C. | 320 | 309 | 299 | 288 | 311 |
| Reaction molar ratio | — | 0.9919 | 0.9939 | 0.9937 | 0.9930 | 0.9850 |
| Terminal amino group | μeq/g | 31.0 | 45.0 | 35.0 | 38.0 | 20.0 |
| Terminal carboxyl group | μeq/g | 97.0 | 95.0 | 86.0 | 95.0 | 140 |
| [NH$_2$] / [COOH] | — | 0.32 | 0.47 | 0.41 | 0.40 | 0.14 |
| Mn | — | 15625 | 14286 | 16529 | 15038 | 12500 |
| Amidation reaction yield | — | 0.9962 | 0.9944 | 0.9957 | 0.9953 | 0.9975 |
| After Mn | — | 16342 | 16295 | 17440 | 15527 | 12600 |
| molding Percentage increase in Mn | % | 4.6 | 14.1 | 5.5 | 3.3 | 0.8 |
| Flexural modulus of elasticity | GPa | 5.0 | 4.9 | 4.7 | 4.6 | 4.8 |

TABLE 2

|  |  | Comparative examples | | |
| --- | --- | --- | --- | --- |
|  |  | 1 | 2 | 3 |
| Sebacic acid | mol % | 100 | 100 |  |
| Adipic acid | mol % |  |  | 100 |
| m-xylylenediamine | mol % |  | 100 | 100 |
| p-xylylenediamine | mol % | 100 |  |  |
| Before molding | Tg | °C. | 75 | 60 | 85 |
|  | Tm | °C. | 280 | 191 | 240 |
|  | Reaction molar ratio | — | 0.9998 | 0.9938 | 1.0124 |
|  | Terminal amino group | μeq/g | 52.9 | 40.0 | 122 |
|  | Terminal carboxyl group | μeq/g | 54.0 | 81.0 | 22.0 |
|  | [NH$_2$]/[COOH] | — | 0.98 | 0.49 | 5.55 |
|  | Mn | — | 18709 | 16529 | 13889 |
|  | Amidation reaction yield | — | 0.9920 | 0.9939 | 0.9851 |
| After molding | Mn | — | 17920 | 17000 | 13200 |
|  | Percentage increase in Mn | % | −4.2 | 2.9 | −5.0 |
|  | Flexural modulus of elasticity | GPa | 2.9 | 3.2 | 4.5 |

INDUSTRIAL APPLICABILITY

The polyamide resins of the present invention have high heat resistance, excellent moldability and also excellent mechanical properties and can be converted into polyamide resin moldings having excellent heat resistance and mechanical properties by a molding process involving melt molding for further amidation reaction in an extruder or a molding machine to increase the molecular weight so that they can be widely used in the fields of highly heat-resistant parts or the like to which polyamide resins could not be applied so far, and therefore, they will find wide industrial applicability.

The invention claimed is:

1. A polyamide resin comprising a diamine unit containing 70 mol % or more of a xylylenediamine unit and a dicarboxylic acid unit containing 70 mol % or more of a straight chain aliphatic dicarboxylic acid unit,
wherein the xylylenediamine unit is composed of 50 to 95 mol % of p-xylylenediamine and 50 to 5 mol % of m-xylylenediamine; the straight chain aliphatic dicarboxylic acid unit is composed of 50 to 100 mol % of adipic acid and 0 to less than 50 mol % of sebacic acid or one or more straight chain aliphatic dicarboxylic acids different from sebacic acid; the molar ratio of reacted diamine units to reacted dicarboxylic acid units (the number of moles of reacted diamine units/the number of moles of reacted dicarboxylic acid units) is less than 0.994; and the polyamide resin has a number average molecular weight of 10,000 to 25,000 and a melting point of 285° C. or more.

2. The polyamide resin according to claim 1, which has a terminal amino group concentration of 10 to 100 μeq/g.

3. The polyamide resin according to claim 1, which has a terminal carboxyl group concentration of 50 to 200 μeq/g.

4. The polyamide resin according to claim 1, wherein the ratio of the terminal amino group concentration to the terminal carboxyl group concentration ([NH$_2$]/[COOH]) is 0.6 or less.

5. The polyamide resin according to claim 1, which has a melting point of higher than 300° C.

6. A heat-resistant part obtained by molding the polyamide resin according to claim 1.

7. The heat-resistant part according to claim 6, which is a reflector for LED, an LED mounting board or a heat sink element.

8. A process for molding a polyamide resin, comprising:
melt-molding a polyamide resin in an extruder or molding machine to subject the polyamide resin to further amidation reaction,
wherein the polyamide resin comprises a diamine unit containing 70 mol % or more of a xylylenediamine unit and a dicarboxylic acid unit containing 70 mol % or more of a straight chain aliphatic dicarboxylic acid unit, the xylylenediamine unit is composed of 50 to 95 mol % of p-xylylenediamine and 50 to 5 mol % of m-xylylenediamine, the straight chain aliphatic dicarboxylic acid unit is composed of 50 to 100 mol % of adipic acid and 0 to less than 50 mol % of sebacic acid or one or more straight chain aliphatic dicarboxylic acids different from sebacic acid, the molar ratio of reacted diamine units to reacted dicarboxylic acid units (the number of moles of reacted diamine units/the number of moles of reacted dicarboxylic acid units) is less than 0.994, and the polyamide resin has a number average molecular weight of 10,000 to 25,000 and a melting point of 285° C. or more.

9. The process for molding a polyamide resin according claim 8, wherein the melt-molding is performed such that the number average molecular weight of the polyamide resin after the melt-molding increases by 0.5 to 50% relative to the number average molecular weight before the melt-molding.

10. The polyamide resin according to claim 1, wherein the xylylenediamine unit is composed of 55 to 95 mol % of p-xylylenediamine and 45 to 5 mol % of m-xylylenediamine.

11. The polyamide resin according to claim 1, wherein the melting point of the polyamide resin is in a range of from 285° C. to 340° C.

12. The polyamide resin according to claim 1, wherein the melting point of the polyamide resin is in a range of from 290° C. to 335° C.

13. The polyamide resin according to claim 1, wherein the melting point of the polyamide resin is in a range of from 300° C. to 330° C.

14. The polyamide resin according to claim 1, wherein the melting point of the polyamide resin is in a range of from 305° C. to 320° C.

15. The polyamide resin according to claim 1, wherein the straight chain aliphatic dicarboxylic acid unit includes 90 to 100 mol % of adipic acid, and the xylylenediamine unit includes 60 to 90 mol % of p-xylylenediamine and 10 to 40 mol % of m-xylylenediamine.

* * * * *